United States Patent [19]
Henseler

[11] Patent Number: 5,869,955
[45] Date of Patent: Feb. 9, 1999

[54] APPARATUS AND METHOD FOR DISPLACING NOISE ON A SIGNAL FROM THE DETECTION THRESHOLD OF AN ELECTRONIC CONTROLLER

[75] Inventor: Ronald R. Henseler, Peoria, Ill.

[73] Assignee: Caterpillar Inc., Peoria, Ill.

[21] Appl. No.: 968,716

[22] Filed: Nov. 12, 1997

[51] Int. Cl.$^6$ .................................................... G05F 1/40
[52] U.S. Cl. ........................................ 323/287; 323/273
[58] Field of Search ................................ 307/51; 363/41; 323/284, 285, 286, 287, 268, 273; 318/811; 388/811

[56] References Cited

U.S. PATENT DOCUMENTS

| 5,029,229 | 7/1991 | Nelson, III | 388/811 |
| 5,414,792 | 5/1995 | Shorey | 388/811 |

*Primary Examiner*—Shawn Riley

[57] ABSTRACT

An adapter designed to connect a dc to dc power converter between a dc power supply and an electronic sensor that provides inputs to an electronic controller. The dc to dc power converter transforms the voltages from the power supply so that the voltage signal to the sensor on the negative lead is biased at a level that prevents noise from triggering an unintended response from the electronic controller.

7 Claims, 4 Drawing Sheets

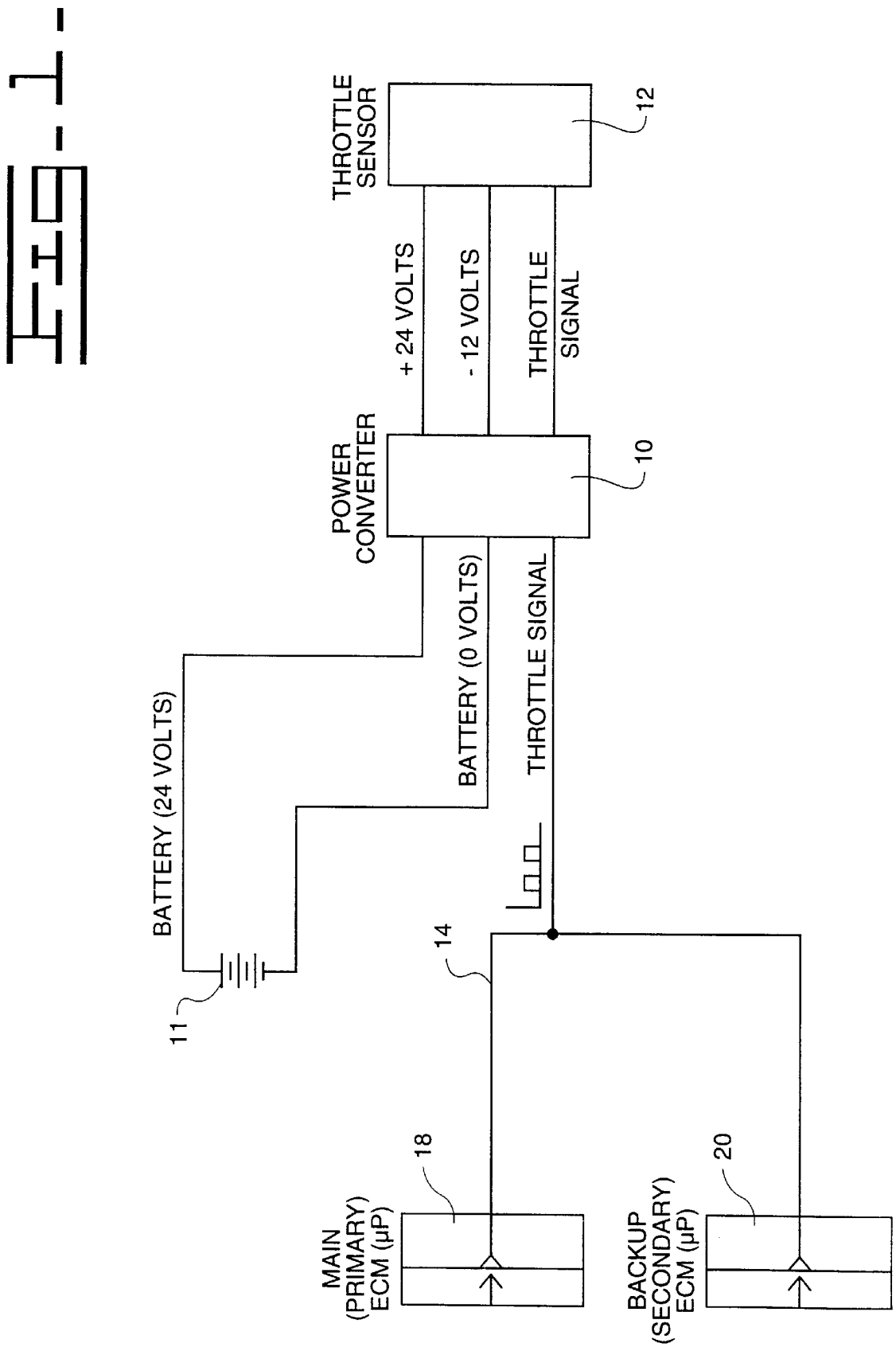

Fig_2_
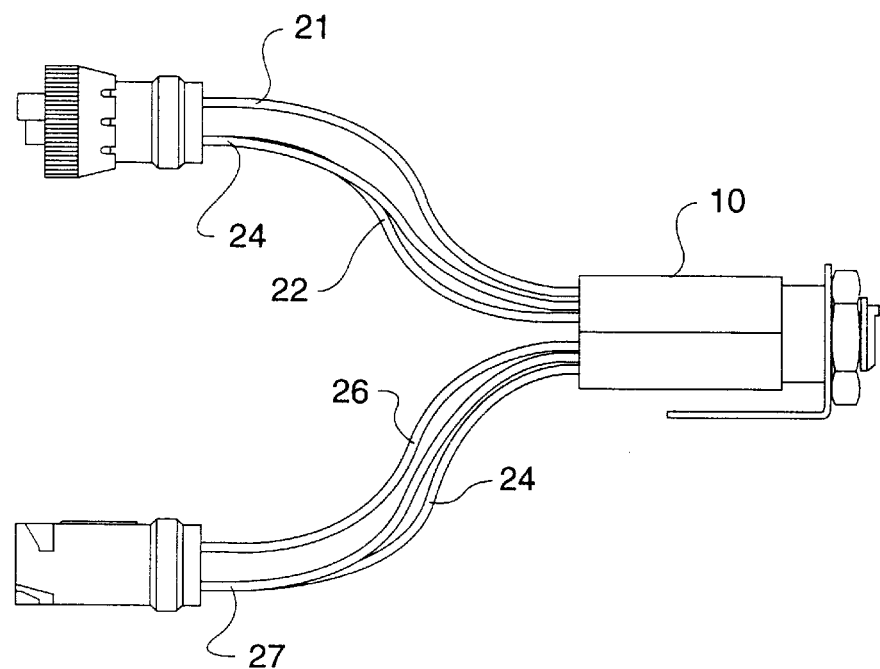
Fig_3_
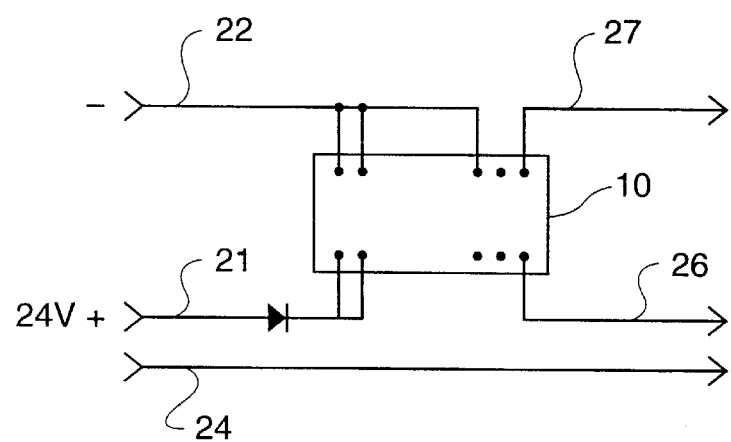

PWM SIGNAL W/O PWR. SUPPLY

PWM SIGNAL WITH PWR. SUPPLY

APPARATUS AND METHOD FOR DISPLACING NOISE ON A SIGNAL FROM THE DETECTION THRESHOLD OF AN ELECTRONIC CONTROLLER

TECHNICAL FIELD

This invention relates generally to an apparatus and a method for displacing noise associated with a sensor signal input to an electronic controller and more particularly, to using a dc to dc power supply to shift the reference voltage and bias the noise associated with a pulse width modulated sensor signal out of the electronic controller's input signal detection threshold.

BACKGROUND ART

In control systems requiring high reliability, redundant electronic controllers are often connected in parallel for backup in the event of a failure. In these systems, the inputs from the sensors and the outputs from the electronic controllers may be connected to ground in a manner that creates high current ground paths and loops in the circuit, causing flyback currents to flow into the electronic controllers and undesired noise on the input signals. An example of this occurs when the solenoid of an inductive component in an engine control system such as a coil or an engine injector has a common ground with one or more pulse width modulated (PWM) type sensors such as a throttle sensor. In this situation, noise is likely to be coupled with the sensor signal. If a momentary spike in the noise level reaches the threshold detection level for the controller input signal, the controller will respond due to the noise instead of the sensor signal, thereby degrading system performance. The noise may also feed back into the sensor circuit and cause false triggering of the throttle sensor PWM signal. Similar noise problems may be caused when a variety of components produced by different manufacturers are used in the same controller.

It is usually expensive and difficult to eliminate this noise. Shielding the wiring, or a redesign of the wiring harness are two potential solutions to the noise problem, however, both are very expensive to implement. Another potential solution is to develop a software program to filter the signal, but developing and installing the software is also very expensive. Relay switches may be used to connect the solenoid common, but system reliability will be lowered. It is also desired to have a cost effective means to correct the noise problem on newly manufactured electronic controllers as well as to retrofit controllers already in use.

Accordingly, the present invention is directed to overcoming one or more of the problems as set forth above.

DISCLOSURE OF THE INVENTION

In one embodiment of the present invention, an adapter is used to connect a dc to dc power converter between a dc power supply and an electronic sensor that provides inputs to an electronic controller. The dc power supply has a negative lead with a voltage of zero or ground and another lead with a positive voltage, such as 24 volts. The dc to dc power converter transforms the voltages from the power supply so that the voltage signal to the sensor on the negative lead is biased at a level that prevents the noise from triggering an unintended response from the control system, for example −12 volts. The power converter provides a voltage signal on the positive lead to the sensor that is at or above the controller's threshold detection level. Using the biased voltages, the sensor generates a signal, such as a PWM type signal, and the electronic controller is configured to detect the signal at or above a designated voltage level. If there is noise on the sensor signal, the transform characteristics of the dc to dc power converter are selected so that noise on the output sensor signal is outside the threshold detection level of the electronic controller. As a result, the noisy sensor output signal does not reach the electronic controller's threshold detection voltage level until an input is detected by the sensor and the sensor outputs a "high" signal within the controller's detection level. Further, when the PWM signal is high, the noisy signal is biased well above the detection threshold level. This substantially eliminates false triggering of the controller due to the noise and also prevents false triggering in the sensor circuit. Although the noise is still present on the signal, the performance of the system is improved because the signal noise is outside the controller's threshold detection region. This adapter provides a retrofit for the control system which is reliable, relatively inexpensive, and easily and quickly installed.

BRIEF DESCRIPTION OF DRAWINGS

FIG. 1 is a schematic diagram of a power converter connected between a dc power supply and a sensor and providing an output signal to dual electronic controllers;

FIG. 2 is a diagram of the adapter for connecting the dc to dc power converter between the dc power supply and the sensor;

FIG. 3 is a schematic diagram of an example of the present invention showing the connection of the inputs and outputs to the pin configuration of the power converter;

BEST MODE FOR CARRYING OUT THE INVENTION

Figure 4:
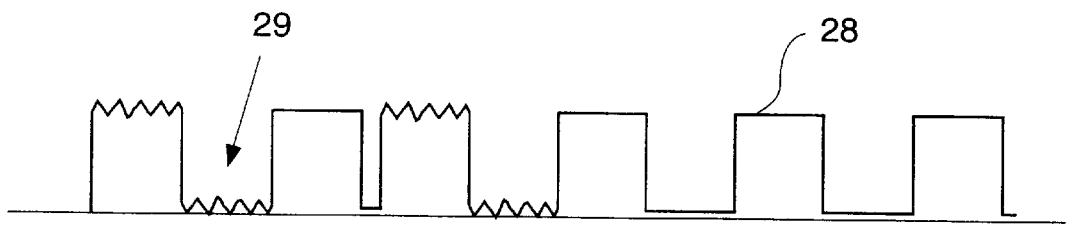
FIG. 4 is a prior art time history diagram of a pulse width modulated sensor output signal coupled with noise where the input voltages to the sensor are provided directly from the dc power supply.

Referring now to the drawings, FIG. 1 illustrates the present invention comprising a dc to dc power converter 10 connected between a dc power supply 11 and a sensor 12. The output signal 14 of the sensor 12 is connected to one or more electronic controllers 18, 20, such as a primary controller 18 and a backup or secondary controller 20 in the case of a dual redundant system. The dc power supply 11 may be a battery or some other device supplying direct current at the required voltage levels. FIG. 1 illustrates a dc battery power supply 11 having a negative lead with zero volts and a positive lead with 24 volts. The power converter 10 is connected to the dc power supply 11 on one end and transforms the voltages from the dc power supply 11 to voltages biasend about a different point, such as a midpoint voltage of zero volts with −12 volts on the negative lead to +12 volts on the positive lead. The result is that the sensor input 14 to the controllers ranges between approximately −12 and +12 volts, depending on the noise level and whether there is an input signal from the sensor.

FIG. 2 illustrates the adapter used to connect the power converter 10 between the dc power supply 11 and the sensor 12. The connector J1 has a first lead 21 for the positive voltage from the power supply, and a second lead 22 for the negative voltage from the power supply. A third lead 24 connects the sensor signal between the connector J1, the power converter 10, and connector J2. The voltages on the positive and negative leads 21, 22 are transformed by the power converter 10 to new values for input to the sensor on the positive voltage lead 26 and the negative voltage lead 27 associated with connector J2.

Dc to dc power converters are readily commercially available and a wide range of voltages and operating characteristics may be selected. For purpose of illustration in the present invention, FIG. 3 is a schematic of the pin configuration of the ETRI model BXA3-24D12 dc to dc power converter 10 showing the connection of the input leads 21, 22 from the battery (dc power supply) and the output leads 26, 27 to the sensor. With this particular power converter, the positive voltage from the battery 20 may range from 18 to 36 volts and the negative voltage from the battery 22 is 0 volts (or ground). The power converter 10 outputs −12 volts on the negative lead 27 to the sensor and +12 volts on the positive lead 26. The transformation characteristics of the power converter are selected based on the voltage level of the dc power supply, the output voltage level of the sensor, the level of noise coupled with the sensor output signal, and the threshold detection voltage level in the controller.

FIG. 4 illustrates the time history of pulse width modulated (PWM) signal 28 from the sensor coupled with a noise signal 29 in a system without the power converter 10. The PWM sensor output signal 28 ranges between zero where there is no input to the sensor and an upper value above the threshold detection level of the electronic controller when the sensor detects an input. A typical example is an engine throttle position sensor detecting a change in the throttle setting. If noise is coupled with the sensor signal 28, voltage spikes will be present in the signal input to the electronic controllers. If the noise level is high enough, the spikes trigger false input to the electronic controller when it is configured to detect leading or trailing edges of the sensor input signal. System performance is thereby degraded because the controller's output to a device, such as the solenoid switch of a fuel injector in an engine, is intermittent and unintentional.

Figure 5:
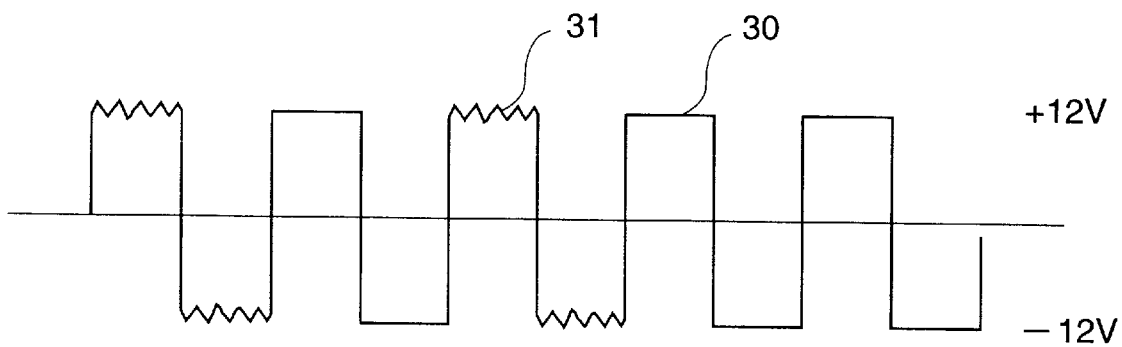
FIG. 5 is a time history diagram of a pulse width modulated sensor output signal coupled with noise where the input voltages to the sensor are biased by a dc to dc power converter.

FIG. 5 illustrates a time history diagram of the PWM zero crossing sensor output signal 30 supplied to the electronic controller in a system having a dc to dc power converter connected between the sensor and the electronic controller. The dc to dc power converter transforms the voltages supplied by the dc power source, for example, from zero volts on the negative lead and twenty four volts on the positive lead, to plus and minus 12 volts on the positive and negative leads, respectively. Comparing FIGS. 4 and 5, the PWM sensor output signal is converted to a signal ranging between plus 12 volts when an input is detected by the sensor, and minus 12 volts when no input is detected. If the electronic controller is configured to detect leading and/or trailing edges of the sensor signal at a designated threshold level, then the sensor input signal 30 coupled with the noise signal 31 that is biased by the power converter will remain outside the threshold detection level whether or not the PWM signal input by the sensor is "high".

The present invention can be designed to handle a wide range of voltage levels associated with the components. It is important to note that the dc to dc switching converter should be chosen so that the sensor input signal coupled with the noise signal is outside the threshold detection voltage of the electronic controller. The switching converter chosen will thus depend on the level of noise in the system as well as the tolerance level for false triggering due to noise.

INDUSTRIAL APPLICABILITY

Figure 6:
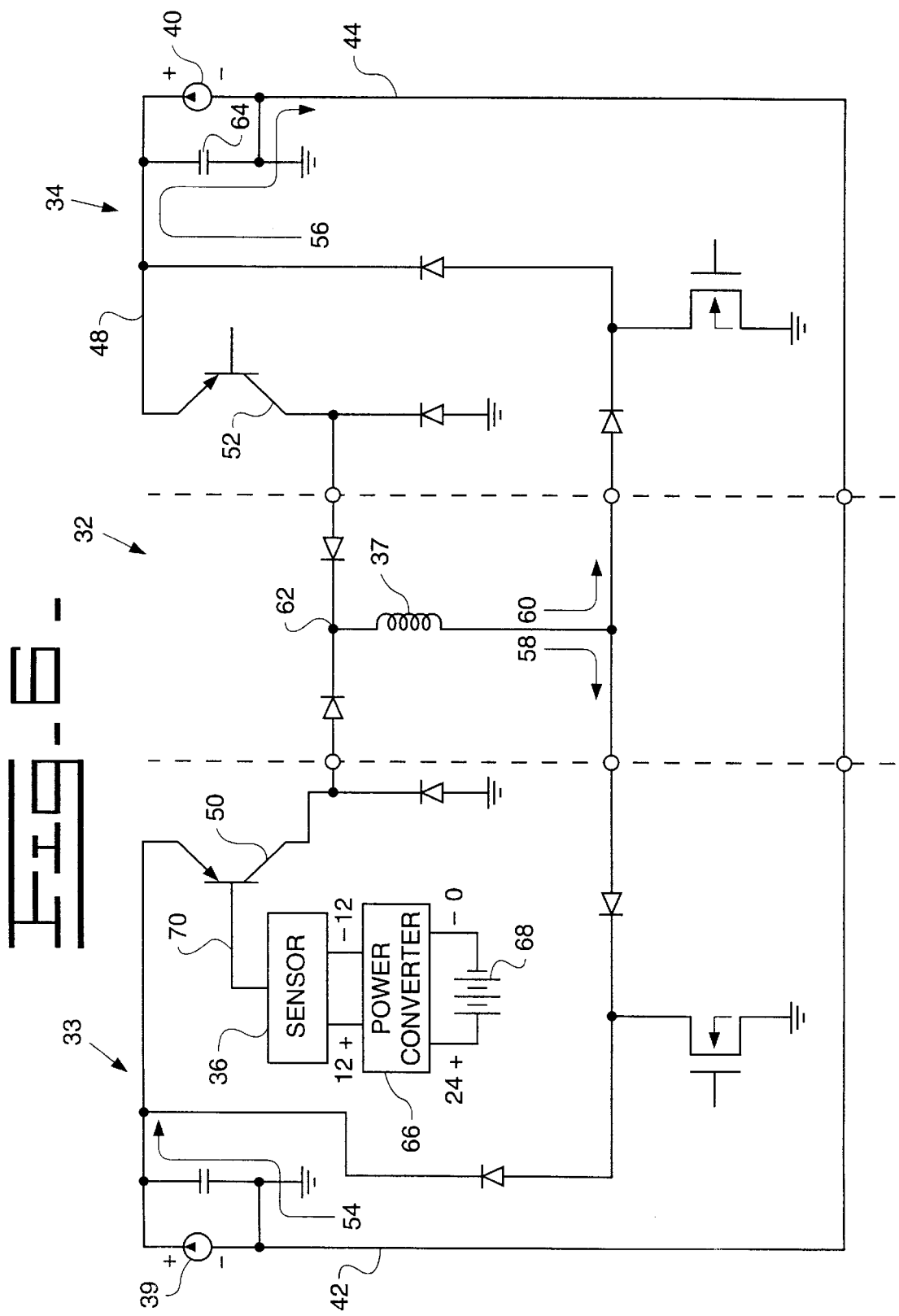
FIG. 6 is a schematic of an application of the present invention to a sensor providing input to dual electronic controllers connected in parallel.

FIG. 6 illustrates an electronic circuit 32 of a main electronic controller 33 and a backup electronic controller 34 connected in parallel. The embodiment in FIG. 6 pertains to dual engine control systems receiving inputs from a throttle position sensor 36 and providing outputs to commonly connected fuel injector solenoid 37. During normal operation, the main engine controller 33 is on, and the backup controller 34 is off. Each controller 33, 34 has a power supply 39, 40 and the ground leads 42, 44 of the supplies are connected in common. The positive leads 46, 48 of the supplies are each connected to a switching transistor 50, 52. The input from the throttle sensor 36 is connected to the base leads of the transistors 50, 52, and the emitters of the transistors 50, 52 are connected in common with the injector solenoid 37.

With the circuit configuration shown in FIG. 6, flyback currents 54, 56 flow through both controllers 33, 34 due to the common injector solenoid returns 38 and common battery minus connections 42, 44. The solenoid flyback path is from the solenoid common connection 38 into the backup controller's 34 power supply 40, down through the output capacitor 64, the battery minus lead 44, back in the battery minus lead 42 of the main controller 33, through the power supply 39, and then to the common connection of the sensor returns 62. The battery minus 42, 44 wire impedances cause the controller potentials to change with changing AC currents. Flyback current paths 58, 60 for the injector solenoid flyback 54, 56 and the power supply current are also present due to the common connection between the sensor returns 62.

The multiple current paths 54, 56, 58, 60 each have different impedances and cause different voltage potentials around the controllers 33, 34 that appears as noise on the signal from the sensor 36. In the prior art, without a power converter connected, the battery supplied 24 volts on the positive lead and 0 volts on the negative lead to the sensor 36. The output voltage signal 70 from the sensor 36 is a PWM signal varying between 0 volts and an upper value depending on the voltage level required to drive the injector solenoid in the engine controller 32, 34. When noise is present in the system, voltage spikes from the noise are coupled with the sensor signal 70. if the noise reaches the voltage level required to drive the injector solenoids, false triggering occurs.

The present invention includes connecting a power converter 66 between the power supply for the sensor 68, and the throttle sensor 36. The power converter 66 transforms the battery voltages of 0 to 24 volts to plus and minus 12 volts before they are input to the sensor 36. The throttle sensor 36 then outputs a PWM signal to the engine controller 33 or 34 to drive the fuel injector solenoid. When the signal 70 from the throttle sensor 36 is "low", any noise in the system must reach a relatively high level, for example, 12 volts, before it reaches a zero voltage level. In order to be detected by the controller 33 or 34, another increment of noise level at least as much as the threshold voltage detectable by the controller must be present. Similarly, when the signal 70 from the throttle sensor 36 is "high", the noisy signal 70 is far enough above the threshold detection level to substantially eliminate false triggering.

The present invention improves system performance by reducing or even eliminating false triggering problems due to noise. The adapter provides an easy and inexpensive solution to noise problems and may be retrofitted in existing systems. It is especially suitable for use with sensors that generate PWM or discrete signals.

Other aspects, objects and advantages of the present invention can be obtained from a study of the drawings, the disclosure and the appended claims.

I claim:

1. An apparatus for displacing noise on a signal outside the detection threshold of an electronic controller comprising:
   a dc power supply;
   a sensor operable to output a signal when an input to the sensor is detected;
   a dc to dc power converter having a first end connected to electrically receive an input signal from the power supply and a second end to electrically transmit an output signal to the sensor, the power converter operable to transform the voltage level from the dc power supply to a different voltage level;
   wherein the sensor output signal is a pulse width modulated signal; and
   wherein the voltage supplied by the power converter to the sensor biases the sensor signal to a value outside the controller's detection threshold voltage level.

2. An apparatus for displacing noise on a signal outside the detection threshold of an electronic controller comprising:
   a dc power supply;
   a throttle sensor operable to output a signal when an input to the sensor is detected;
   a dc to dc power converter having a first end connected to electrically receive an input signal from the power supply and a second end to electrically transmit an output signal to the throttle sensor, the power converter operable to transform the voltage level from the dc power supply to a different voltage level; and
   wherein the dc to dc power converter is operable to transform the input signal from one voltage level to a different voltage level.

3. An apparatus for displacing noise on a signal outside the detection threshold of an electronic controller comprising:
   a dc power supply;
   a throttle sensor operable to output a signal when an input to the sensor is detected;
   a dc to dc power converter having a first end connected to electrically receive an input signal from the power supply and a second end to electrically transmit an output signal to the throttle sensor, the power converter operable to transform the voltage level from the dc power supply to a different voltage level;
   wherein the output signal from the throttle sensor is connected to a switch in the electronic controller; and
   wherein the electronic controller is operable to detect the throttle sensor signal above a threshold voltage level.

4. The apparatus, as set forth in claim 3, wherein the throttle sensor signal is a voltage value outside the controller's detection threshold voltage level until the throttle sensor outputs a signal to the controller to indicate a change in the throttle setting.

5. An apparatus for displacing noise on a signal outside the detection threshold of an electronic controller comprising:
   a first electronic controller connected in parallel with a second electronic controller;
   a sensor having an output signal connected to provide input to the electronic controllers;
   a power supply;
   a power converter connected to the sensor at one end, and the power supply at the other end;
   wherein the sensor signal is a pulse width modulated signal; and
   wherein the power converter transforms the output signal to a value outside the controller's threshold voltage detection level.

6. A method for displacing noise on a signal outside the detection threshold of an electronic controller comprising:
   connecting a first electronic controller in parallel with a second electronic controller;
   connecting a sensor having an output signal to the electronic controllers to provide input to the electronic controllers; and
   connecting a power converter between the sensor and a power supply.

7. The method, as set forth in claim 6, further comprising the step of transforming the voltage supplied by the power supply to another voltage that is biased outside the controller's threshold voltage detection level.

* * * * *